United States Patent
Perera

(10) Patent No.: US 8,452,579 B1
(45) Date of Patent: May 28, 2013

(54) SYSTEM AND METHOD OF SIMULATING A DRIVE-TRAIN SYSTEM

(75) Inventor: Huron S. Perera, Carrollton, TX (US)

(73) Assignee: Textron Innovations Inc., Providence, RI (US)

( * ) Notice: Subject to any disclaimer, the term of this patent is extended or adjusted under 35 U.S.C. 154(b) by 333 days.

(21) Appl. No.: 12/787,837

(22) Filed: May 26, 2010

(51) Int. Cl.
 - *G06F 7/60* (2006.01)
 - *G06F 17/10* (2006.01)
 - *G06G 7/48* (2006.01)
 - *G06F 17/50* (2006.01)

(52) U.S. Cl.
 CPC ........ *G06F 17/5018* (2013.01); *G06F 17/5009* (2013.01)
 USPC ........................................ 703/7; 703/2; 703/6

(58) Field of Classification Search
 USPC ..................................... 703/2, 6, 7
 See application file for complete search history.

(56) References Cited

U.S. PATENT DOCUMENTS

| | | | |
|---|---|---|---|
| 5,377,310 A | 12/1994 | Jain et al. | |
| 5,546,508 A | 8/1996 | Jain et al. | |
| 7,904,280 B2 * | 3/2011 | Wood | 703/2 |
| 7,954,593 B2 * | 6/2011 | Dornhege et al. | 180/446 |

OTHER PUBLICATIONS

G. Sohl and J. Bobrow, "A recursive multibody dynamics and sensitivity algorithm for branched kinematics chains," tech. rep., Department of Mechanical Engineering, University of California, Jun. 2000.*

Featherstone, R., The Calculation of Robot Dynamics Using Articulated-Body Inertias, The International Journal of Robotics Research, Spring 1983, pp. 13-30, vol. 2, No. 1.

Ascher, Uri M., et al., Forward Dynamics, Elimination Methods, and Formulation Stiffness in Robot Simulation, International Journal of Robotics Research, pp. 749-758, vol. 16, No. 6. Dec. 1997.

Dreier, M.E., Introduction to Helicopter and Tiltrotor Flight Simulation, American Institute of Aeronautics and Astronautics, 2007.

Featherstone, R., Robot Dynamics Algorithms, Kluwer Academic Publishers, 1987, pp. 89-105.

Perera, Huron S., Recursive Algorithm for Efficient Real-Time Simulation of Generic Drive-Train Systems, Presented at the American Helicopter Society 65 Annual Forum, May 28, 2009, Grapevine, Texas.

* cited by examiner

*Primary Examiner* — Mary C Jacob
*Assistant Examiner* — Aniss Chad
(74) *Attorney, Agent, or Firm* — James E. Walton; Damon R. Hickman

(57) ABSTRACT

The present application includes a system and method of simulating a drive-train system including: developing a drive-train simulation model, the drive-train simulation model being represented in a tree-type typology, trimming the mathematical drive-train equation to a steady-state condition, and executing a time domain simulation of the drive-train system with a recursive algorithm. The recursive algorithm involves: performing an outward kinematics recursion, performing an inward dynamics recursion, and performing an outward acceleration recursion.

16 Claims, 5 Drawing Sheets

SYSTEM AND METHOD OF SIMULATING A DRIVE-TRAIN SYSTEM

The U.S. Government has a paid-up license in this invention and the right in limited circumstances to require the patent owner to license others on reasonable terms as provided for by the terms of Technology Investment Agreement W911W6-06-2-0002 awarded by the National Rotorcraft Technology Center Research Program.

BACKGROUND

1. Field of the Invention

The present application relates to a system and method of simulating a drive-train system in real time.

2. Description of Related Art

Traditionally, governing equations of motion for a drive-train system are derived and expressed in mathematical matrix form. The matrix is either inverted or decomposed using one of several available methods. Because the matrix does not have any time-varying terms, the inversion or decomposition is performed only once. Subsequently, the accelerations are solved for each time-step by multiplying the applied torques with the inverted matrix or performing a back-substitution using the decomposed matrix with the applied torques. Typically, each mathematical matrix, and its inversion or decompositions, have a larger number of zero number elements in the matrix elements. Multiplication of the zero number elements with applied torques results in a very slow and cumbersome process, thereby leading to inefficient and problematic simulation of the drive-train system.

Hence, there is a need for an improved system and method for simulating a drive-train system.

DESCRIPTION OF THE DRAWINGS

The novel features believed characteristic of the system and method of the present application are set forth in the appended claims. However, the system and method itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
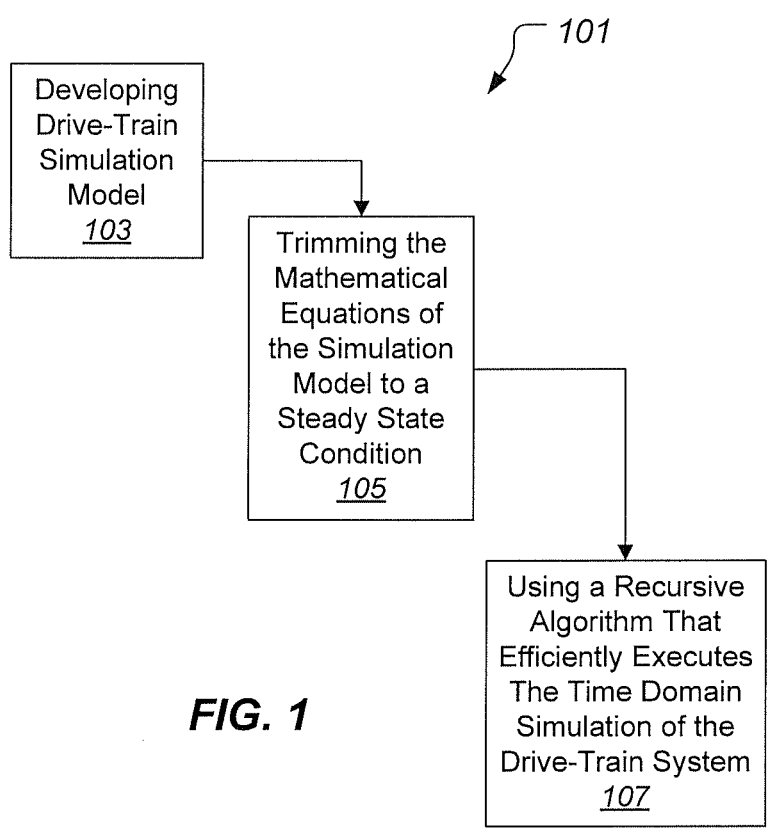
FIG. 1 is a schematic block diagram of a method of simulating a drive-train system in real time, according to the preferred embodiment of the present application.

Referring to FIG. 1 in the drawings, a method 101 of simulating a drive-train system in real time, according to the preferred embodiment of the present application is illustrated. Method 101 involves a step 103 for developing of a drive-train simulation model, a step 105 for trimming the mathematical equations of the simulation model to a steady state condition, and a step 107 for using a recursive algorithm that efficiently executes the time domain simulation of the drive-train system.

Figure 2:
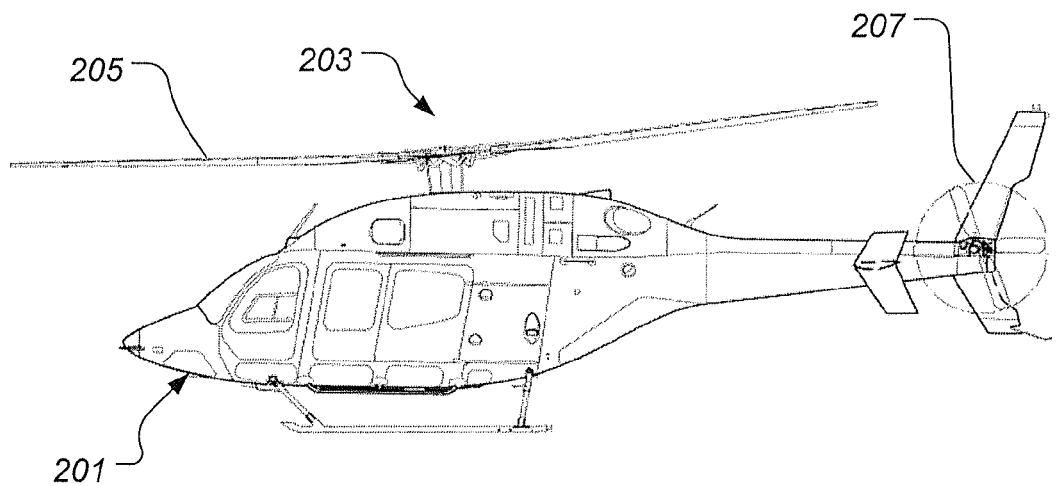
FIG. 2 is an aircraft having an exemplary drive-train system.

Referring to FIG. 2 in the drawings, an aircraft 201 is shown having a drive-train system 203. Drive-train system 203 includes a main rotor 205, a tail rotor 207, and at least one engine for providing torque to main rotor 205, tail rotor 207, and other auxiliary equipment. Drive-train system 203 further includes flexible drive shafts and couplings for connecting the engine to main rotor 205, tail rotor 207, and other auxiliary equipment. It should be appreciated the drive-train system 203 is merely exemplary of a wide variety of drive-train configurations which can be simulated using method 101 of the present application. For example, drive-train system 203 can be configured having any number of engines, as well any number of rotor systems. Moreover, even though aircraft 201 is exemplified as a traditional helicopter, other air based vehicles such as airplanes, tiltrotors, quad tilt rotors, to name a few, can benefit from method 101 of the present application. Furthermore, any air, land, and sea based vehicle having a drive system can benefit from method 101 of the present application.

Figure 3:
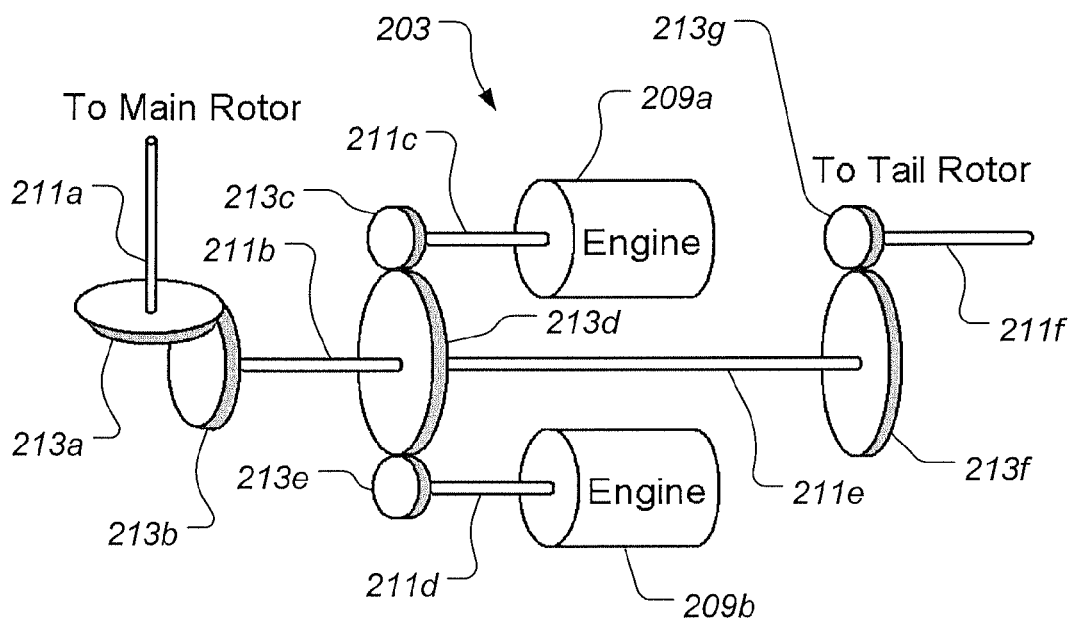
FIG. 3 is an illustration of the drive-train system from FIG. 2.

Referring now also to FIG. 3 in the drawings, drive-train system 203 is schematically shown in further detail. Engines 209a and 209b are schematically shown as connected to main rotor 205 and tail rotor 207 via flexible drive shafts 211a-211f and gears 213a-213g. The dynamics of drive-train system 203 during operation of aircraft 201 are very complicated. Each flexible drive shaft 211a-211f is torsionally flexible. Each gear 213a-213g exhibits unique inertia characteristics. Friction losses occur in each coupling (not shown) and gear 213a-213g. Resistance in main rotor 205, tail rotor 207, and auxiliary equipment, frequently change during operation. All of these aforementioned characteristics contribute to a drive-train system 203 that can be complicated to model for purposes of real-time simulation. It is important to be able to simulate drive-train 203 in real-time for at least the several reasons. One reason is that by simulating drive-train 203 in real-time, a pilot can have an understanding, through flying in a simulator, of the behaviors of the aircraft during changes in the drive-train system. For example, it is important to be able to simulate a sudden engine failure during flight so that a pilot can accurately experience the change in flight dynamics during simulation training. Another reason is that by real-time simulation of a drive-train system, designers can insure the drive-train system components can withstand the dynamic stresses induced under a variety of realistic flight conditions. Furthermore, the real-time simulation of drive-train system 203 allows the designers of feedback control systems to properly account for the transient dynamic response of drive-train system 203.

Figure 4:
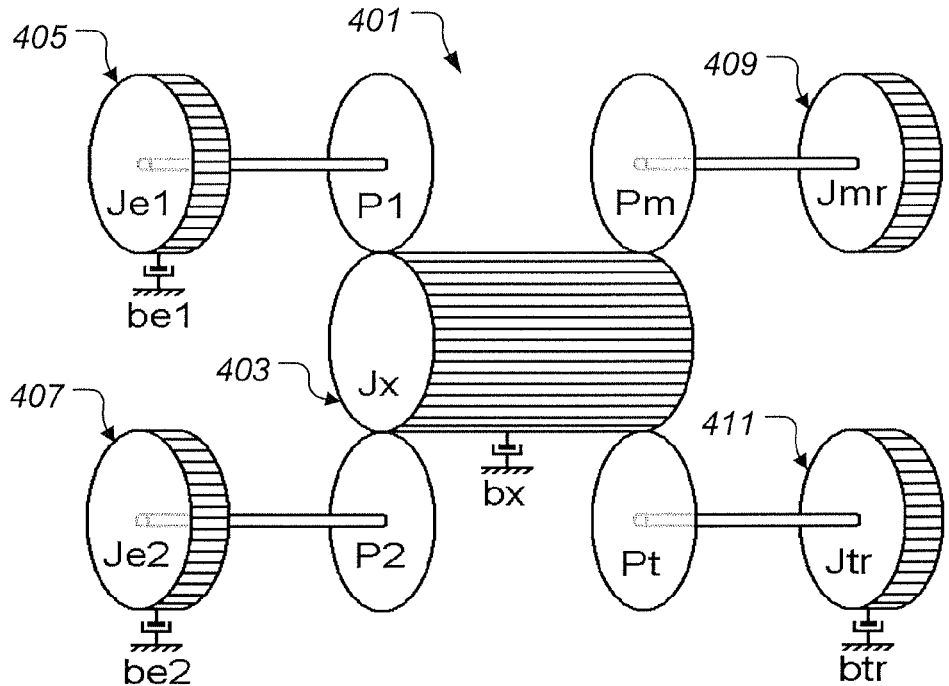
FIG. 4 is a schematic for representing the drive-train system from FIG. 2.

Referring now to FIG. 4 in the drawings, drive-train system 203 is schematically represented as a schematic 401 for purposes of developing a drive-train simulation model of drive-train system 203, in step 103 of method 101. A tree type topology 501 (shown in FIG. 5) is used in order to develop an efficient real-time simulation in accordance with method 101. In order to construct tree type topology 501, it is beneficial to develop schematic 401 representing drive-train 203. In schematic 401, the main shaft 403 and its connections to engines 405 and 407, main rotor 409, and tail rotor 411 are shown schematically.

Figure 5:
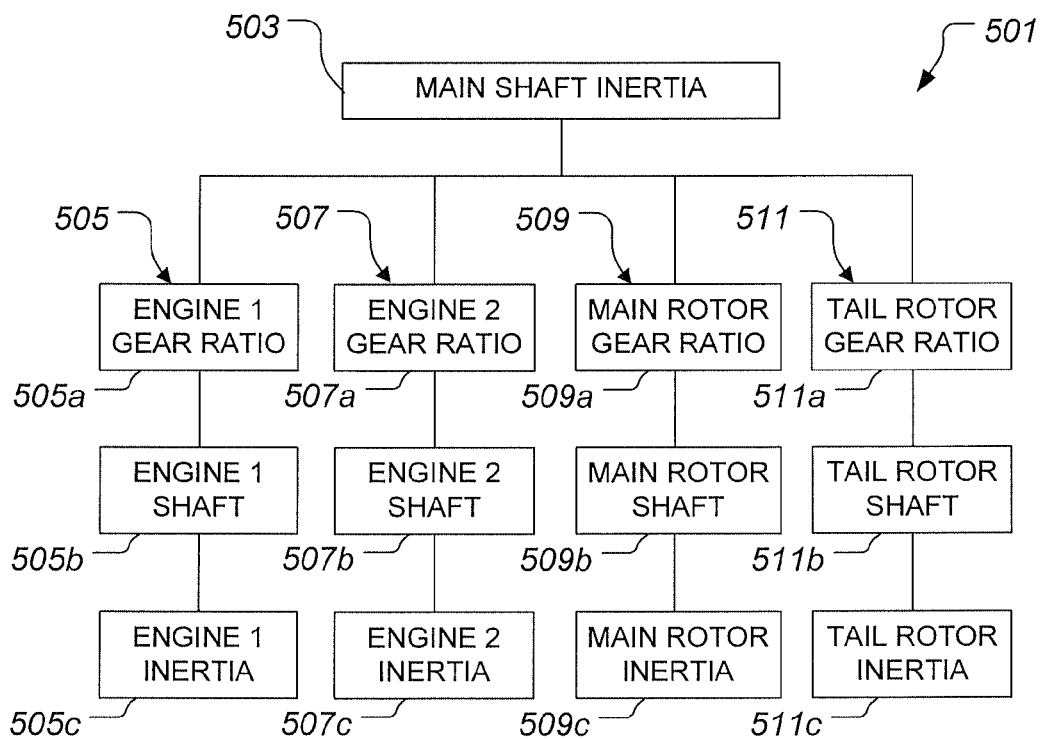
FIG. 5 is a tree type topology of the schematic shown in FIG. 4.

Referring now to FIG. 5 in the drawings, drive-train simulation model is shown in a tree type topology 501. Tree type topology 501 is a tree type representation of schematic 401 shown in FIG. 4. In tree type topology 501, main shaft inertia 503 is represented as the base. Branch groups 505, 507, 509, and 511 correspond with engines 405 and 407, main rotor 409, and tail rotor 411, respectively, as shown in FIG. 4. Branch group 505 comprises an engine 1 gear ratio branch element 505a, an engine 1 shaft branch element 505b, and an engine 1 inertia leaf element 505c. Branch group 507 comprises an engine 2 gear ratio branch element 507a, an engine 2 shaft branch element 507b, and an engine 2 inertia leaf element 507c. Branch group 509 comprises a main rotor gear ratio branch element 509a, a main rotor shaft branch element 509b, and a main rotor inertia leaf element 509c. Branch group 511 comprises a tail rotor gear ratio branch element 511a, a tail rotor shaft branch element 511b, and a tail rotor inertia leaf element 511c.

Still referring to FIG. 5 in the drawings, in the preferred embodiment, each element has only a rotational degree of freedom. In contrast, each element in a generic multi-body system can have up to six degrees of freedom. Further, the tree type topology 501 is referred to as a tree type since it does not have closed loops. In other words, once the branches are separated from a parent, an element of a branch does not connect back with an element in a sibling branch. By limiting each element to only the rotational degree of freedom, instead of six degrees of freedom, the complexity of the computations in step 107 of method 101 is greatly reduced, thereby resulting in a very efficient real-time simulation of the system. For example, elements 505b, 507b, 509b, and 511b are susceptible to a very small amount of shaft bending in addition to rotational deflection; however, since the rotational deflection is predominant, it is the only degree of freedom solved for in the recursive algorithm of step 107. Tree type typology 501 is discussed further herein regarding the recursive algorithm 601 in FIG. 6.

Mathematical equations are used in the development of drive-train simulation model, of step 103. The angular displacement of each gear (massive or pinion) of the drive-train is denoted as $\theta_i$, i=1,N. It is assumed that there are n−1 flexible shafts in the drive-train. The rigid body motion of the whole drive-train is included such that the total number of independent degrees of freedom is equal to n. It follows that n number of gear chains with one or more gears in a chain are present in the system. Choose one gear from each of these chains as an independent degree of freedom and denoting the $\theta_i$ of those as $\phi_j$, j=1,n. Then relationship between $\theta_i$ and $\phi_j$ is written as $$\left\{ \theta \atop Nx1 \right\} = \left[ N_g \atop Nxn \right] \left\{ \phi \atop nx1 \right\} \quad (1)$$

Denote the shaft deflections as $\delta_i$, i=1,n−1. Then each shaft deflection is equal to the difference between the angular displacements of the two gears to which the shaft is connected. Hence a relationship between $\delta$ and $\theta$ can be written as $$\left\{ \delta \atop (n-1)x1 \right\} = \left[ R \atop (n-1)xN \right] \left\{ \theta \atop Nx1 \right\} \quad (2)$$

The torque applied on each independent gear chain consists of the torques due to stiffness and damping of the shafts to which the chain is connected, case damping of each gear in the chain and the external torques applied on any gear in the chain. If the total torque vector applied on each gear in the drive-train is denoted as $q_{Ti}$, i=1,N then $$\left\{ q_T \atop Nx1 \right\} = \left\{ q_{ext} \atop Nx1 \right\} + \left[ K_s \atop Nx(n-1) \right] \left\{ \delta \atop (n-1)x1 \right\} + \left[ C_s \atop (n-1)x1 \right] \left\{ \dot{\delta} \atop (n-1)x1 \right\} - \left[ C_c \atop NxN \right] \left\{ \dot{\theta} \atop Nx1 \right\} \quad (3)$$

Subscripts "s" and "c" on the damping matrices mean "shaft" and "case" respectively. Due to the fact that gear ratio relationship transferring torques between gears in contact is the inverse of the relationship relating the rotational speeds of the gears, the torques on the gears representing the independent degrees of freedom, $q_{ej}$, j=1,n are expressed as $$\left\{ q_e \atop nx1 \right\} = \left[ N_g^T \atop nxN \right] \left\{ q_T \atop Nx1 \right\} \quad (4)$$

Then by applying Newton's second law on each gear representing the independent degrees of freedom, the equations of motion are $$\left[ J \atop nxn \right] \left\{ \ddot{\phi} \atop nx1 \right\} = \left\{ q_e \atop nx1 \right\} \quad (5)$$

where J is a diagonal matrix with the diagonal terms containing the contribution of inertia from each of the gears in a gear chain. Combining equations 1-5, the equations of motion for the drive-train become $$\left[ J \atop nxn \right] \left\{ \ddot{\phi} \atop nx1 \right\} = \left[ N_g^T \atop nxN \right] \left[ K_s \atop Nx(n-1) \right] \left\{ \delta \atop (n-1)x1 \right\} + \left[ N_g^T \atop nxN \right] \quad (6)$$

$$\left( \left[ C_s \atop Nx(n-1) \right] \left[ R \atop (n-1)xN \right] - \left[ C_c \atop NxN \right] \right) \left[ N_g \atop Nxn \right] \left\{ \dot{\phi} \atop nx1 \right\} + \left[ N_g^T \atop nxN \right] \left\{ q_{ext} \atop Nx1 \right\}$$

The state space form of the equations of motion, for the drive-train simulation model, is $$\left\{ \dot{\delta} \atop (n-1)x1 \atop \ddot{\phi} \atop nx1 \right\} = \begin{bmatrix} 0 \atop (n-1)x(n-1) & RN_g \atop (n-1)xn \\ J^{-1}N_g^T K_s \atop nx(n-1) & J^{-1}N_g^T(C_s R - C_c)N_g \atop nxn \end{bmatrix} \quad (7)$$

$$\left\{ \delta \atop (n-1)x1 \atop \phi \atop nx1 \right\} + \begin{bmatrix} 0 \atop (n-1)xN \\ J^{-1}N_g^T \atop nxN \end{bmatrix} \left\{ q_{ext} \atop Nx1 \right\}$$

Determination of Drive-Train States at Trim

Step 105 involves trimming the equations of motion, which means the accelerations are zero. When the drive-train is in trim, the deflection rate $\dot{\delta}$ of the shafts is zero. For a given rotation speed of the rotors the rotation speeds of all the gears ($\dot{\theta}$ and $\dot{\phi}$) can then be found by following the shaft connections and the contacts in each gear chain. Then by denoting [K]= $[N_g^T][K_s]$, [C]=$[N_g^T]([C_s][R]-[C_c])[N_g]$, {q}=$[N_g^T]\{q_{ext}\}$ and with equation (4), equation (6) can be written in the simple form $$[J]\{\ddot{\phi}\} = [K]\{\delta\} + [C]\{\dot{\phi}\} + \{q\} \quad (8)$$

For trim, $\ddot{\phi}=0$ and therefore the equations of motion for trim are $$[K]\{\delta\}+[C]\{\dot{\phi}\}+\{q\}=\{0\} \quad (9)$$

It should be noted that m number of $q_i$, i=1,n above are unknown engine torques. Assume that $q_i$, i=1,n−m are known and $q_i$, i=n−m+1,n are unknown. Denote the known engine torques as $q_{eni}$, i=1,n−m, and the unknown engine torques as $q_{ni, i=1,m}$. Then equations in (9) can be expanded as $$\left[\underset{nx(n-1)}{K}\right]\left\{\underset{(n-1)x1}{\delta}\right\}+\left[\underset{nxn}{C}\right]\{\dot{\phi}\}_{nx1}+\left\{\underset{nx1}{q_{en\delta}}\right\}+\left[\underset{nxm}{K_{\delta u}}\right]\left\{\underset{mx1}{q_u}\right\}=\left\{\underset{nx1}{0}\right\} \quad (10)$$

where $$\left\{\underset{nx1}{q_{en\delta}}\right\}=\left\{\begin{array}{c}q_{en}\\{}_{(n-m)x1}\\0\\{}_{mx1}\end{array}\right\} \quad (11)$$

and $$\left[\underset{nxm}{K_{\delta u}}\right]=\left[\begin{array}{c}0\\{}_{(n-m)xm}\\I\\{}_{mxm}\end{array}\right] \quad (12)$$

Let the torque required by the m number of engines be distributed as $$q_{nj}=\lambda_{j-1}q_{i1}, j=2,m \quad (13)$$

Then the m−1 equations in (10) can be written in matrix form as $$\left[\underset{(m-1)xm}{K_u}\right]\left\{\underset{mx1}{q_u}\right\}=\left\{\underset{(m-1)x1}{0}\right\} \quad (14)$$

where $$\underset{(m-1)xm}{K_u}=\begin{bmatrix}1 & -\lambda_1 & \cdots & 0\\1 & 0 & \cdots & 0\\\cdots & \cdots & \cdots & \cdots\\1 & 0 & \cdots & -\lambda_{m-1}\end{bmatrix}$$

or $K_{uij}=1$ for $j=1$ $K_{uij}=-\lambda_j$ for $j>1, j=i+1$ $K_{uij}=0$ for $j>1, j\neq i+1$ \quad (15)

If the n number of equations in (10) and m−1 number of equations in (14) are combined, the total set of n+m−1 equations can be written as $$\begin{bmatrix}\underset{nx(n-1)}{K} & \underset{nxm}{K_{\delta u}}\\\underset{(m-1)x(n-1)}{0} & \underset{(m-1)xm}{K_u}\end{bmatrix}\left\{\begin{array}{c}\delta\\{}_{(n-1)x1}\\q_u\\{}_{mx1}\end{array}\right\}+\begin{bmatrix}\underset{nxn}{C} & \underset{nx(m-1)}{0}\\\underset{(m-1)xn}{0} & \underset{(m-1)x(m-1)}{0}\end{bmatrix}\left\{\begin{array}{c}\dot{\phi}\\{}_{nx1}\\0\\{}_{(m-1)x1}\end{array}\right\}+ \quad (16)$$

$$\left\{\begin{array}{c}q_{en\delta}\\{}_{nx1}\\0\\{}_{(m-1)x1}\end{array}\right\}=\left\{\underset{(n+m-1)x1}{0}\right\}$$

Equation set (16) has n+m−1 number of equations with same number of unknowns and can be solved for the unknowns $\delta$ and $q_n$.

Stability Analysis

Dropping the forcing function on the right hand side of equation (7) yields the homogeneous form needed for stability analysis of the drive-train model. Eigen analysis of the dynamic matrix provides several useful functions. Inspection of the eigen values for positive real parts indicates unstable modes and likely a construction error in the equations. Comparison of the roots with results from more sophisticated analyses ensures correctness of the drive-train system model. Eigen values resulting from the stability analysis gives the user the natural frequencies of the system. The period associated with the highest natural frequency establishes an upper bound on the time-domain integration step size. Comparing the drive-train frequencies with main and tail rotor modal frequencies gives the user a means to detect dynamic coupling between these systems. This is especially important in loads analysis. Similarly, comparing the natural frequencies of the drive-train to those of the fuel control/engine system is important in loads analysis and handling qualities analysis.

Time Domain Maneuver Simulation with a Recursive Algorithm

In order to perform time domain maneuver simulations, in step 107 of method 101, the matrix equation of motion in (6) needs to be solved for accelerations at each time-step and numerically integrated to find angular velocities of the gears in the system and the shaft deflections. One technique of directly solving the matrix equation of motion involves computing the right hand side of equation (6) and multiplying with the inverse of the inertia matrix to first determine $\ddot{\phi}$. Numerical integration combined with the derivatives of equations (1) and (2) leads to the determination of $\dot{\phi}$ and $\delta$. It should be noted that conventional steps involve several matrix to vector multiplications. All the matrices involved are generally sparse in nature. Even though the inversion of the inertia matrix need be done only once at the start, since it does not change with time, the several zeros computed in the sparse matrices to vector multiplications presents a case for optimization in a real-time simulation. A recursive algorithm 601 presented herein avoids computing the aforementioned matrices and therefore is more efficient than the direct solution of the matrix equation.

As schematically shown in FIG. 5, the drive-train mathematical model having a tree-type topology 501 is built with one or more of the following types of elements: Rotary Inertia, Gear Contact (to define the gear ratios between Rotary Inertia Elements) and Flexible Shafts. A user-specified rotary inertia element is chosen as the base 503 (main shaft Inertia) and the drive-train then becomes a system with tree-type topology 501 in which the torque absorbers and torque generators are attached to the leaf elements. Torque generators attached to a drive-train system are engines and the torque absorbers are the rotors, air-conditioners, and auxiliary equipment. The tree-type topology 501 is defined with a parent-child relationship for each element in the drive-train. In defining the parent-child relationship of two elements in the tree, the element closer to the base or the root is referred to as the parent and the element closer to the leaves of the branch is referred to as the child.

Figure 6:
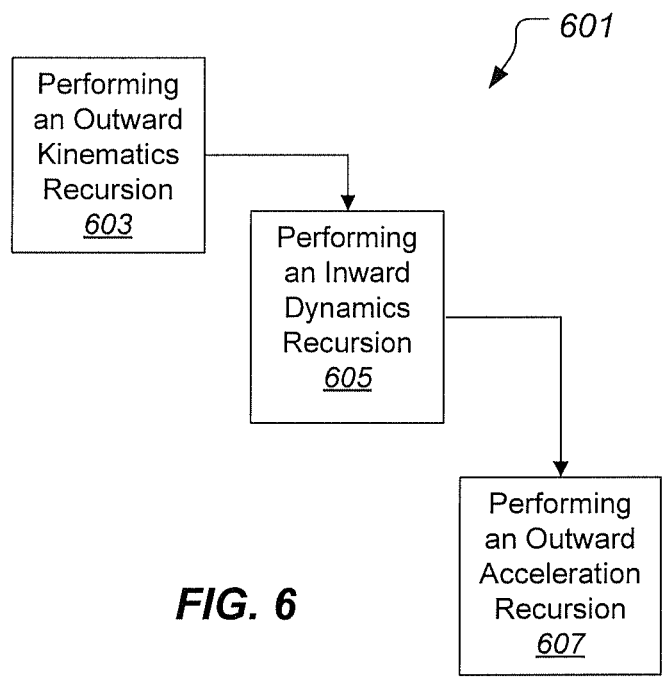
FIG. 6 is a schematic block diagram of a recursive algorithm according to the preferred embodiment of the present application.

Referring now also to FIG. 6, recursive algorithm 601 is schematically shown. The recursive algorithm 601 for each time-step in method 101 is carried out by performing an outward (base to leaf elements) kinematics recursion 603, an inward (leaf elements to base) dynamics recursion 605, and finally an outward acceleration recursion 607. Before the start of the time-step in recursive algorithm 601, the state of the independent variables ([φ, φ̇] of the base, and [δ, δ̇] of all flexible shafts) are known as a result of the numerical integration at the end of the previous time-step or from the trim state if this time step is the first. Outward kinematics recursion 603 is performed to determine the state of the dependent variables ([θ, θ̇] of all rotary inertia elements other than the base). Inward dynamics recursion 605 computes a rotational inertia quantity $J^R$ and a torque quantity $\tau^*$, starting with the torques generated and absorbed at the leaf elements. The final outward accelerations recursion 607 uses $J^R$ and $\tau^*$ to compute the independent accelerations (φ̈ of the base, and δ̈ of all flexible shafts). It should be noted that δ is defined here as the angular displacement of inward end of the flexible shaft subtracted from that of outward end.

Figure 7:
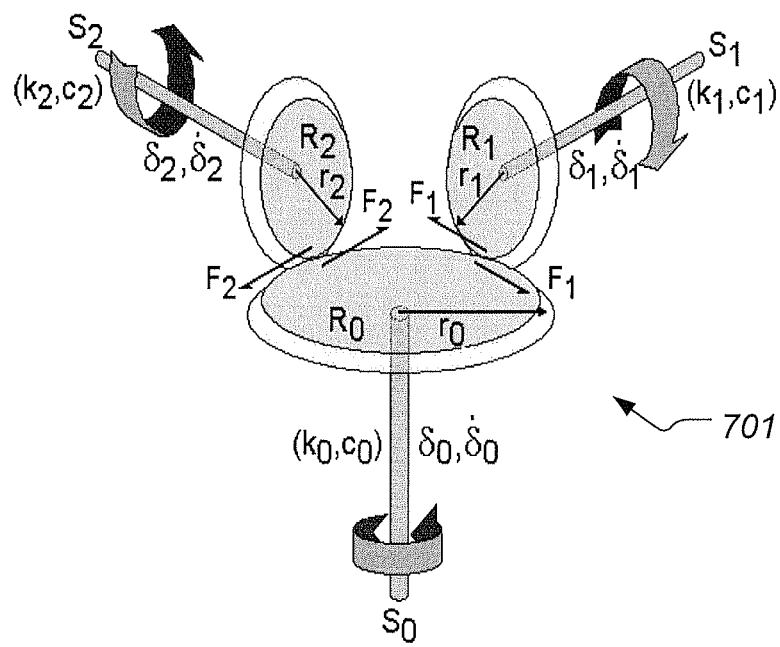
FIG. 7 is a partial schematic representation of the drive-train system.

Referring now also to FIG. 7 in the drawings, the derivation of the recursive relations is demonstrated by considering a partial section 701 of the drive-train system 203 starting at the end of a flexible shaft element $S_0$ and ending at in number of branches that are connected to the flexible shafts $S_j$, j=1,m. For purposes of clarity, only the first two branches are shown in FIG. 7. The torque balance of rotary inertia element $R_0$ yields the equation $$J_0 \ddot{\theta}_0 = \tau_0^e - k_0 \delta_0 - c_0 \dot{\delta}_0 - c_{c0} \dot{\theta}_0 - \sum_{j=1}^{m} F_j r_0 \quad (17)$$

where $J_0$, $\theta_0$, $\tau_0^e$, $c_{c0}$ and $r_0$ are the rotational inertia, angular displacement, externally applied torque, case damping rate and contact radius respectively of the rotational inertia element $R_0$. The quantities $k_0$, $c_0$ and $\delta_0$ are the torsional spring rate, torsional damping rate and angular deflection of the flexible shaft element $S_0$. $F_j$ is the contact force between $R_0$ and the rotational inertia element in $j^{th}$ branch. Similarly, the torque balance of rotational inertia element in $j^{th}$ branch yields the equation $$J_j \ddot{\theta}_j = \tau_j^e + k_j \delta_j + c_j \dot{\delta}_j - c_{cj} \dot{\theta}_j + F_j r_j \quad (18)$$

The following kinematical relation can be written for gear contacts in each branch $$r_j \theta_j = r_0 \theta_0 \quad (19)$$

Substitution of the second time derivative of equation (19) eliminates $\ddot{\theta}_j$ from equation (18). Subsequent combination of equation (18) with equation (17) eliminates $F_j$ and yields the equation $$\left[ J_0 + \sum_{j=1}^{m} J_j \gamma_j^2 \right] \ddot{\theta}_0 = \quad (20)$$

$$\tau_0^e - k_0 \delta_0 - c_0 \dot{\delta}_0 - c_{c0} \dot{\theta}_0 + \sum_{j=1}^{m} \left[ \tau_j^e + k_j \delta_j + c_j \dot{\delta}_j - c_{c0} \dot{\theta}_j \right] \gamma_j$$

where $\gamma_j$, the gear ratio between $R_0$ and $R_j$ is given by $$\gamma_j = r_0 / r_j \quad (21)$$

An expression similar to equation (20) can be used at the outward end of every flexible shaft element and the base rotary inertia element to solve for all the unknown accelerations of the system for performing an outward kinematics recursion 603. The inertia quantity known as the reflected inertia ($J^R$) on the left hand side and the torque quantity ($\tau^*$) on the right hand side are determined during the inward dynamics recursion 605. It should be noted that each type of drive-train element makes a different contribution to these quantities of equation (20). $J^R$ and $\tau^*$ are accumulated and passed inwards at each element while being saved at flexible shaft elements to be used for computing accelerations during outward accelerations recursion. Examination of the contribution of each type of element and straightforward generalization leads to the following equations for inward dynamics recursion 605.

If the $i^{th}$ element is a rotary inertia where i increases outwards from 0 at the base, $$J_{i-1}^R = J_i^R + J_i \quad (22)$$

$$\tau_{i-1}^* = \tau_i^* + \tau_i^e - c_{ci} \dot{\theta}_i \quad (23)$$

If the $i^{th}$ element is a gear contact, $$J_{i-1}^R = \gamma_i^2 J_i^R \quad (24)$$

$$\tau_{i-1}^* = \gamma_i \tau_i^* \quad (25)$$

If the $i^{th}$ element is a flexible shaft, $$J_{i-1}^R = 0 \quad (26)$$

$$\tau_{i-1}^* = k_i \delta_i + c_i \dot{\delta}_i \quad (27)$$

and the quantities $J_i^R$ and $\tau_i^* - \tau_{i-1}^i$ are saved for use during outward acceleration recursion 607. If the element i−1 has multiple branches, the quantities $J^R$ and $\tau^*$ from all connected branches are accumulated. At the base rotary inertia element the acceleration is computed as, $$\ddot{\theta}_0 = \frac{\tau_0^* + \tau_0^e - c_{c0} \dot{\theta}_0}{J_0^R + J_0} \quad (28)$$

to start the outward accelerations recursion 607. Then if the $i^{th}$ element is a flexible shaft, $$\ddot{\theta}_i = \frac{\tau_i^* - \tau_{i-1}^*}{J_i^R} \quad (29)$$

$$\ddot{\delta}_i = \ddot{\theta}_i - \ddot{\theta}_{i-1} \quad (30)$$

If the $i^{th}$ element is a gear contact, $$\ddot{\theta}_i = \gamma_i \ddot{\theta}_{i-1} \quad (31)$$

If the $i^{th}$ element is a rotary inertia, $$\ddot{\theta}_i = \ddot{\theta}_{i-1} \quad (32)$$

Computation of Inertia, Stiffness and Damping Matrices Using Recursive Formulae

The time domain maneuver simulation using recursive algorithm 601 does not require the computation of inertia, stiffness and damping matrices in equation (8). However, the matrices are required for trimming and stability analysis. It should be noted that the configuration of drive-train system 203 is defined in how it is divided into a set of different types of elements which forms tree-type topology 501 when assembled together. Therefore, it is desirable to derive a method that uses the same parent-child relationships that defines the topology.

The equation (28) for the base rotational inertia and equation (30) for each flexible shaft make up the full equations of motion for the system. Note that $\ddot{\theta}_i$ in equation (30) can be eliminated with equation (20) and $\ddot{\theta}_{i-1}$ can be eliminated with the similar equation representing the next flexible shaft encountered during the inward recursion 605. Therefore, when this system of equations is written in matrix form it becomes a matrix equation similar to equation (8). The difference is that the independent degrees of freedom will be the angular displacement ($\phi$) of base rotational inertia and the angular deflection ($\delta$) of all flexible shafts instead of the angular deflection ($\phi$) of rotational inertia elements selected as the independent variables in equation (8). Due to the difference in independent degrees of freedom, the inertia, stiffness, and damping matrices will also be different. However, there is only one set of natural frequencies for the system, and when used in the stability analysis, both sets of matrices must lead to the same answers for the natural frequencies.

Close examination of the derivation of the recursive relations shown previously indicates that inward recursion 605 followed by outward recursion 607 can be performed just collecting the quantities contributing to the matrices instead of solving for accelerations. During the inward recursion 605 the quantities contributing to the inertia, stiffness and damping matrices from $\ddot{\theta}_i$ in equation 30 are accumulated. Then during the outward recursion the similar quantities contributing from $\ddot{\theta}_{i-1}$ are accumulated. Each equation of the system similar to equation 30 along with equation 28 then leads to each row of the inertia, stiffness and damping matrices.

Figure 8:
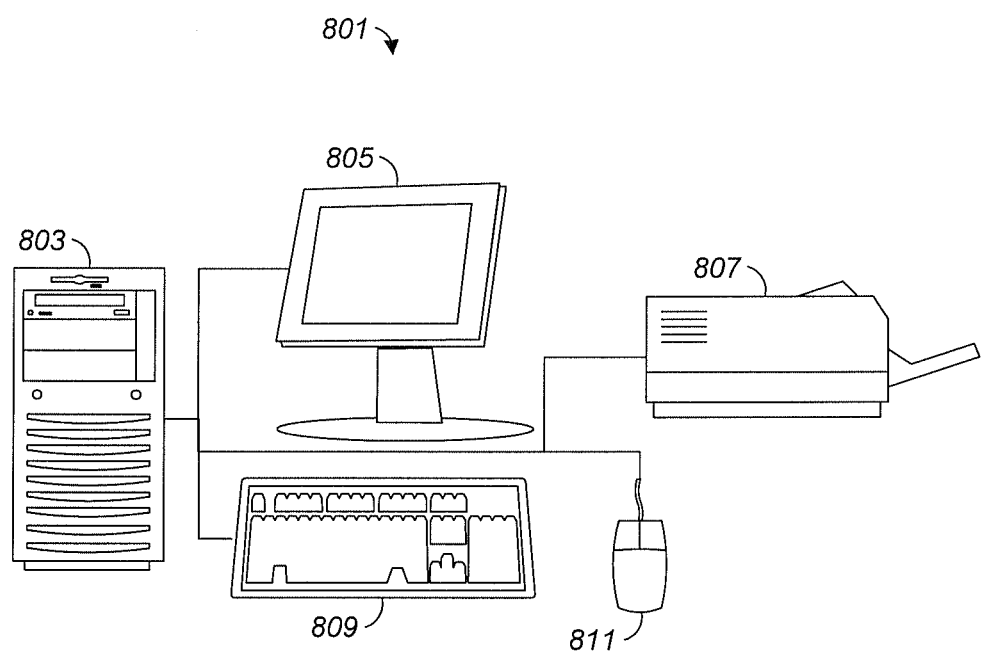
FIG. 8 shows a block diagram of an example of a specific machine that can serve as an embodiment of a system for performing the method of simulating a drive-train system in real time.

Referring to FIG. 8 in the drawings, a block diagram is shown as an example of a specific machine that can serve as an embodiment of a system 801 for performing at least part of method 101 of the present application. System 801 includes a computer 803, which serves as a data storage system and a data processing system. Computer 803 includes components commonly associated with personal computers, workstations, and servers, such as a central processing unit (CPU), non-volatile memory, such as a hard drive, volatile memory, such as random access memory (RAM), communication ports and controllers, such as universal serial bus (USB) ports, and can also include networking and wireless communications subsystems for communicating with other computers and peripheral components. Computer 803 stores software instructions for instructing the CPU to perform any of the tasks of method 101 described herein. Computer 803 can also include means for communicating with removable storage media, such as a compact disc (CD), digital video disc (DVD), and solid state memory such as a flash memory USB drive. System 801 can include a display 805 and a printer 807, which both serve as examples of output devices for computer 803. System 801 can further include a keyboard 809 and a mouse 811.

Embodiments of system 801 which incorporate method 101 can be incorporated into a flight simulation machine being configured to simulate flight of an aircraft. Thus, while the exemplary embodiment of system 801 is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The present disclosure provides a system and method for simulating a drive-train system in real time. The examples illustrated in the present disclosure are applicable to simulation of a drive-train system in an aircraft in a simulation environment. However, the concepts described herein can also be applied to other drive-train applications. For example, the system and method of the present application can be used to simulate any drive-train system in a wide variety of configurations. The concepts described herein provide for a particularly efficient process that requires less processing time as compared to prior systems and facilitate real time simulation.

It is apparent that a method with significant advantages has been described and illustrated. Although the method of the present application is shown in a limited number of forms, it is not limited to just these forms, but is amenable to various changes and modifications without departing from the spirit thereof.

The invention claimed is:

1. A computer-implemented method of simulating a drive-train system, the method being performed using one or more processing units, the method comprising:
   developing a drive-train simulation model having a mathematical drive-train equation, the drive-train simulation model being represented in a tree-type typology;
   trimming the mathematical drive-train equation to a steady-state condition; and
   executing a time domain simulation of the drive-train system with the one or more processing units using a recursive algorithm, the recursive algorithm comprising:
   first, performing an outward kinematics recursion;
   second, performing an inward dynamics recursion to compute a rotational inertia quantity and a torque quantity; and
   finally, performing an outward acceleration recursion;
   wherein the outward acceleration recursion is based upon the rotational inertia quantity and the torque quantity.

2. The method of claim 1, wherein the tree-type topology represents the drive-train system as a base member and a plurality of elements in one or more branches, such that each element is limited to a rotational degree of freedom.

3. The method of claim 2, wherein the trimming the mathematical drive-train equation to a steady-state condition involves allowing a deflection acceleration of a shaft element to equal zero, wherein the shaft element is included in the plurality of elements in one or more branches.

4. The method of claim 2, wherein the executing a time domain simulation of the drive-train system with a recursive algorithm prevents the need to multiply a matrix equation so as to allow for efficient real-time simulation of the drive-train system.

5. The method of claim 2, wherein the plurality of elements in one or more branches are associated to each other in parent/child relationships.

6. The method of claim 2, wherein the performing the outward kinematics recursion is performed to calculate a state of a dependent variable of the plurality of elements in one or more branches.

7. The method of claim 2, wherein the performing the outward acceleration recursion is performed to calculate at least one acceleration of rotational deflection.

8. A method of simulating a drive-train system comprising:
modeling the drive-train system in a tree-type topology, the tree-type topology comprising:
- a base member to represent inertia of a component in the drive-train system;
- one or more branches attached to the base member, each branch comprising a group of elements such that each element represents one of: a gear ratio, a shaft deflection, and a rotational inertia; and
- wherein each branch is general enough to have sub-branches without forming a closed loop;

executing a time domain simulation of the drive-train system, using a computer, with a recursive algorithm, the recursive algorithm comprising:
- an outward kinematics recursion for calculating an angular displacement and an angular velocity in each of the elements in all the branches;
- an inward dynamics recursion to calculate a rotational inertia quantity and a torque quantity in each of the elements in all the branches; and
- an outward acceleration recursion to calculate an acceleration of rotational deflection across each of the flexible shaft elements in all the branches;

wherein the outward acceleration recursion is based upon the rotational inertia quantity and the torque quantity.

9. The method of claim 8, wherein the executing the time domain simulation of the drive-train system with the recursive algorithm is an iterative process.

10. A simulation system for simulating a drive-train system, the simulation system comprising one or more processing units and non-volatile memory storing computer-readable instructions for:
executing a time domain simulation of the drive-train system with the one or more processing units using a recursive algorithm, the recursive algorithm comprising:
performing an outward kinematics recursion;
performing an inward dynamics recursion;
wherein the performing the inward dynamics recursion is performed to calculate a rotational inertia quantity and a torque quantity; and
performing an outward acceleration recursion based upon the rotational inertia quantity and the torque quantity;
wherein the drive-train system is schematically represented in a tree type topology for purposes executing the time domain simulation using the recursive algorithm.

11. The system of claim 10, further comprising computer-readable instructions for:
trimming a mathematical drive-train equation to a steady-state condition.

12. The system of claim 11, wherein the trimming the mathematical drive-train equation to a steady-state condition involves allowing a deflection acceleration of a shaft element to equal zero.

13. The system of claim 10, wherein the tree-type topology represents the drive-train system as a base member and a plurality of elements in one or more branches, such that each element is limited to a rotational degree of freedom.

14. The system of claim 10, wherein the executing a time domain simulation of the drive-train system with the recursive algorithm prevents the need to multiply a matrix equation so as to allow for efficient real-time simulation of the drive-train system.

15. The system of claim 10, wherein the performing the outward kinematics recursion is performed to calculate a state of a dependent variable of the plurality of elements in one or more branches of the tree type topology.

16. The system of claim 10, wherein the performing the outward acceleration recursion is performed to calculate at least one acceleration of rotational deflection in a shaft element of the tree type topology.

* * * * *